US012427797B2

(12) United States Patent
Hegarty et al.

(10) Patent No.: US 12,427,797 B2
(45) Date of Patent: Sep. 30, 2025

(54) INDUCTIVE COVER STATE SENSORS FOR MEDIA PROCESSING DEVICES

(71) Applicant: ZEBRA TECHNOLOGIES CORPORATION, Lincolnshire, IL (US)

(72) Inventors: Patrick J. Hegarty, Dedham, MA (US); Stephen A. Carello, Johnston, RI (US); Devan J. Lippman, Cumberland, RI (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/766,472

(22) Filed: Jul. 8, 2024

(65) Prior Publication Data

US 2024/0359494 A1 Oct. 31, 2024

Related U.S. Application Data

(63) Continuation of application No. 18/195,088, filed on May 9, 2023, now Pat. No. 12,030,325, which is a continuation of application No. 17/194,925, filed on Mar. 8, 2021, now Pat. No. 11,673,415.

(51) Int. Cl.

*B41J 3/36* (2006.01)
*B41J 29/13* (2006.01)
*B41J 29/38* (2006.01)
*B41J 3/407* (2006.01)

(52) U.S. Cl.

CPC ................. *B41J 29/38* (2013.01); *B41J 3/36* (2013.01); *B41J 29/13* (2013.01); *B41J 3/4075* (2013.01)

(58) Field of Classification Search

CPC . B41J 29/38; B41J 29/13; B41J 3/4075; B41J 3/36

See application file for complete search history.

(56) References Cited

U.S. PATENT DOCUMENTS

2006/0165467 A1* 7/2006 Kawakami ............. B41J 3/4075 400/613
2011/0242250 A1* 10/2011 Yada ........................ B41J 29/13 347/108

* cited by examiner

*Primary Examiner* — Scott A Richmond

(57) ABSTRACT

A media processing device includes: a body defining a media supply chamber and carrying a print head; a cover carrying a platen roller, the cover having an open position enabling access to the chamber, and a closed position enclosing the chamber, and cooperating with the body to define a media path extending from the chamber, between the print head and the platen roller, to a media outlet; a target conductor affixed to one of the body and the cover; and an inductive proximity sensor affixed to the other of the body and the cover, disposed to detect the target conductor when the cover is closed.

16 Claims, 5 Drawing Sheets

INDUCTIVE COVER STATE SENSORS FOR MEDIA PROCESSING DEVICES

RELATED APPLICATIONS

The present application is a continuation of U.S. patent application Ser. No. 18/195,088, filed on May 9, 2023, which is a continuation of U.S. patent application Ser. No. 17/194,925, filed on Mar. 8, 2021, both of which are incorporated by reference herein in their entirety.

BACKGROUND

A media processing device, such as a label printer, may be implemented in a mobile format, e.g. with a housing sized to enable the printer to be carried by an operator travelling throughout a facility. Such a printer may be used, for example, to apply shipping labels, pricing labels, or the like, to items in the facility. Mobile printers may also be deployed for other uses, such as printing receipts in a retail environment.

The mobile printer, as a result of its portability and travel through the facility with the operator, may be subject to drops and other impacts. Such impacts may damage internal components of the printer and interfere with optimal operation of the printer.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
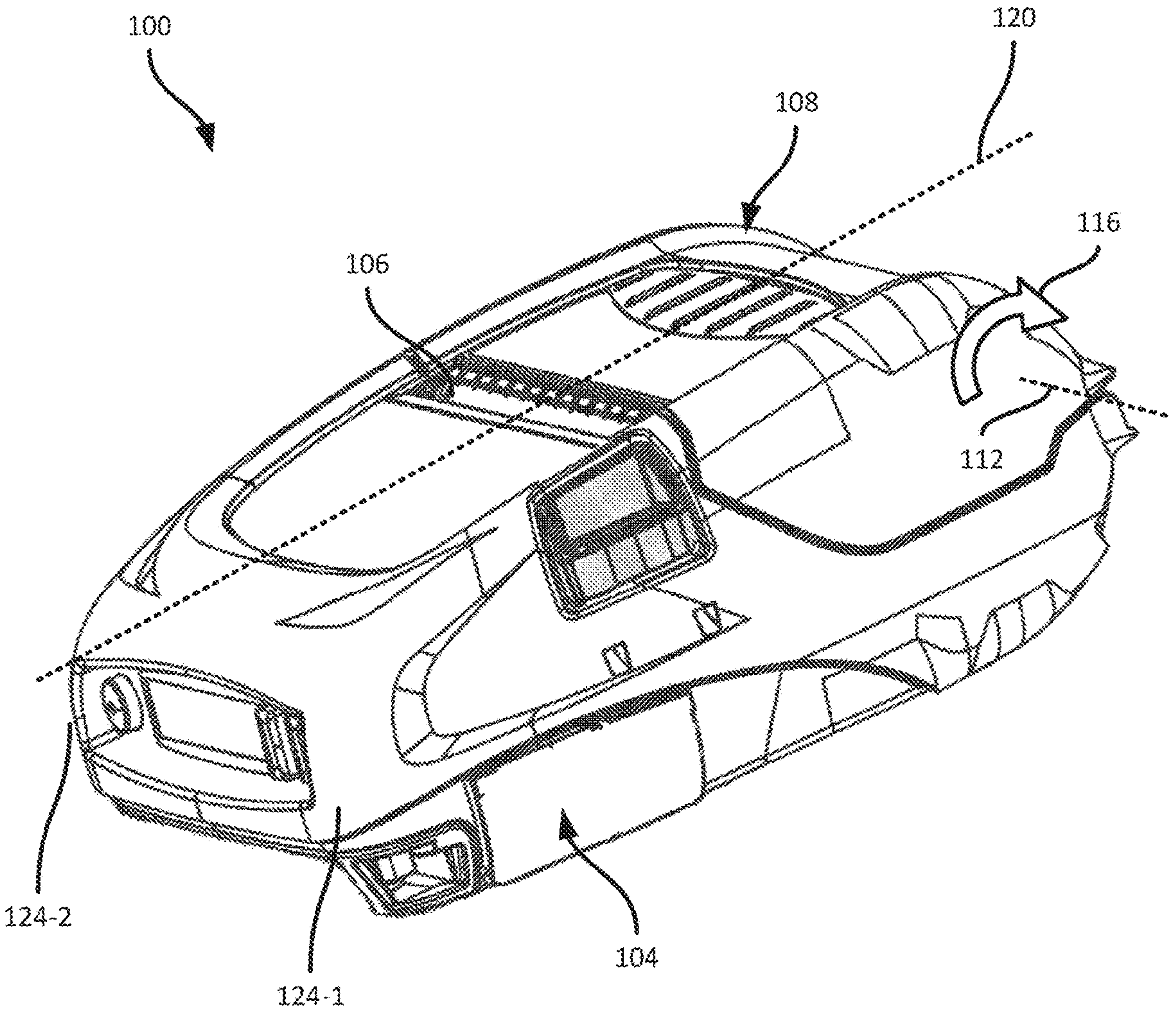
FIG. 1 is a diagram of a printer with a lid thereof in a closed position.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A media processing device, such as a printer (e.g. a label printer, a receipt printer or the like) with mobile form factors may include a body that defines a chamber holding a supply of media, and a cover that is movable relative to the body to enclose the chamber or permit access to the chamber (e.g. to load media into the printer). The printer may include a sensor to determine whether the cover is open or closed, and operation of the printer may be prevented until the cover is closed. In some implementations, a cover state sensor includes a flag mounted on the cover, which traverses a gap in the body of the printer, which is monitored by an optical gap sensor. Thus, when the flag enters the gap (e.g. when the cover is closed), the optical sensor detects that the gap is obstructed. Conversely, when the cover is opened, the flag may leave the gap, and the optical sensor detects that the gap is cleared.

Other printers may use a mechanical switch, such as a post on the cover that engages with a latch in the body to determine whether the cover is open or closed. The above sensing mechanisms, however, rely on relatively small moving parts which may be readily damaged when the printer is struck or dropped, as may occur during regular use of a mobile printer. Damage to the cover state sensor may render the printer inoperable, or may result in suboptimal operation, e.g. if the sensor incorrectly reports that the cover is closed when the cover is not in fact fully closed. As a further example, because the above-mentioned sensors require a degree of physical engagement between the cover-based components and the body-based components, the sensors cannot be placed in the media path (i.e. the path travelled by the labels or paper during operation), because they would obstruct the media path. Such cover state sensors are generally therefore disposed to one side of the media path. Positioning alongside the media path increases the risk that the sensor will falsely report that the cover is closed when in fact only one side of the cover has fully latched (e.g. the side closest to the sensor) while the other side remains unlatched.

Examples disclosed herein are directed to a media processing device including: a body defining a media supply chamber and carrying a print head; a cover carrying a platen roller, the cover having an open position enabling access to the chamber, and a closed position enclosing the chamber, and cooperating with the body to define a media path extending from the chamber, between the print head and the platen roller, to a media outlet; a target conductor affixed to one of the body and the cover; and an inductive proximity sensor affixed to the other of the body and the cover, disposed to detect the target conductor when the cover is closed.

Additional examples disclosed herein are directed to a media processing device, comprising: a body defining a media supply chamber and a first guide surface; a cover movably coupled to the body between an open position to expose the media supply chamber, and a closed position to enclose the media supply chamber, the cover including a second guide surface configured to cooperate with the first guide surface, when the cover is closed, to define a media path from the media supply chamber to an outlet; an inductive sensor at a first of the first and second guide surfaces; and a target conductor at a second of the first and second guide surfaces, for detection by the inductive sensor when the cover is closed.

FIG. 1 illustrates a media processing device 100, such as a mobile printer (the media processing device 100 is also referred to herein simply as the printer 100). The printer 100 includes a body 104 that defines a media supply chamber configured to hold a supply of media, such as a spool or labels, paper, or the like. The body also contains, as will be discussed in greater detail below, a print mechanism that includes a print head configured to apply indicia to the media as the media travels along a media path from the chamber to an outlet 106. The indicia may be applied by any suitable mechanism (e.g. thermal transfer, direct thermal, or the like).

The printer 100 also includes a cover 108 movably coupled to the body 104. In particular, the cover 108 in the illustrated example is rotatably mounted to the body 104 by a hinge, defining an axis of rotation 112. The cover 108 is therefore rotatable from the closed position shown in FIG. 1, in a direction 116 towards an open position. In the open position, the cover 108 permits access to the media chamber defined within the body 104, e.g. to install a supply of media therein.

As will be discussed below, the body 104 and the cover 108 include guide surfaces that define a media path for the media to travel from the supply toward a nip formed by a print head and a platen roller, and then to the outlet 106. As will be apparent, therefore, for optimal operation of the printer 100, the cover 108 is closed so as to align the above-mentioned guide surfaces to form the media path. Operating the printer 100 when the cover is not fully closed may result in reduced print quality, media jams and the like. The printer 100 therefore includes a cover state sensor configured to detect whether the cover 108 is fully closed. In some examples, the cover state sensor detects only whether the cover is fully closed or not (i.e. any state other than fully closed being considered open). In other examples, the cover state sensor can also detect a degree of closure between fully closed and open states.

The cover state sensor set forth herein is an inductive sensor (which may also be referred to as an inductive proximity sensor) that reduces or eliminates the use of protruding components from the body 104 and/or the cover 108, such as the flag or latch mentioned above, which are prone to damage when the printer 100 is dropped or struck. The cover state sensor may therefore be more resilient than those mentioned earlier. In addition, the cover state sensor can be disposed within the bounds of the media path defined by the printer 100, rather than at one side of the printer 100. That is, the sensor can be disposed closer to a midline 120 of the printer 100, shown in FIG. 1, than to either of the sides 124-1 and 124-2 of the printer 100.

Figure 2:
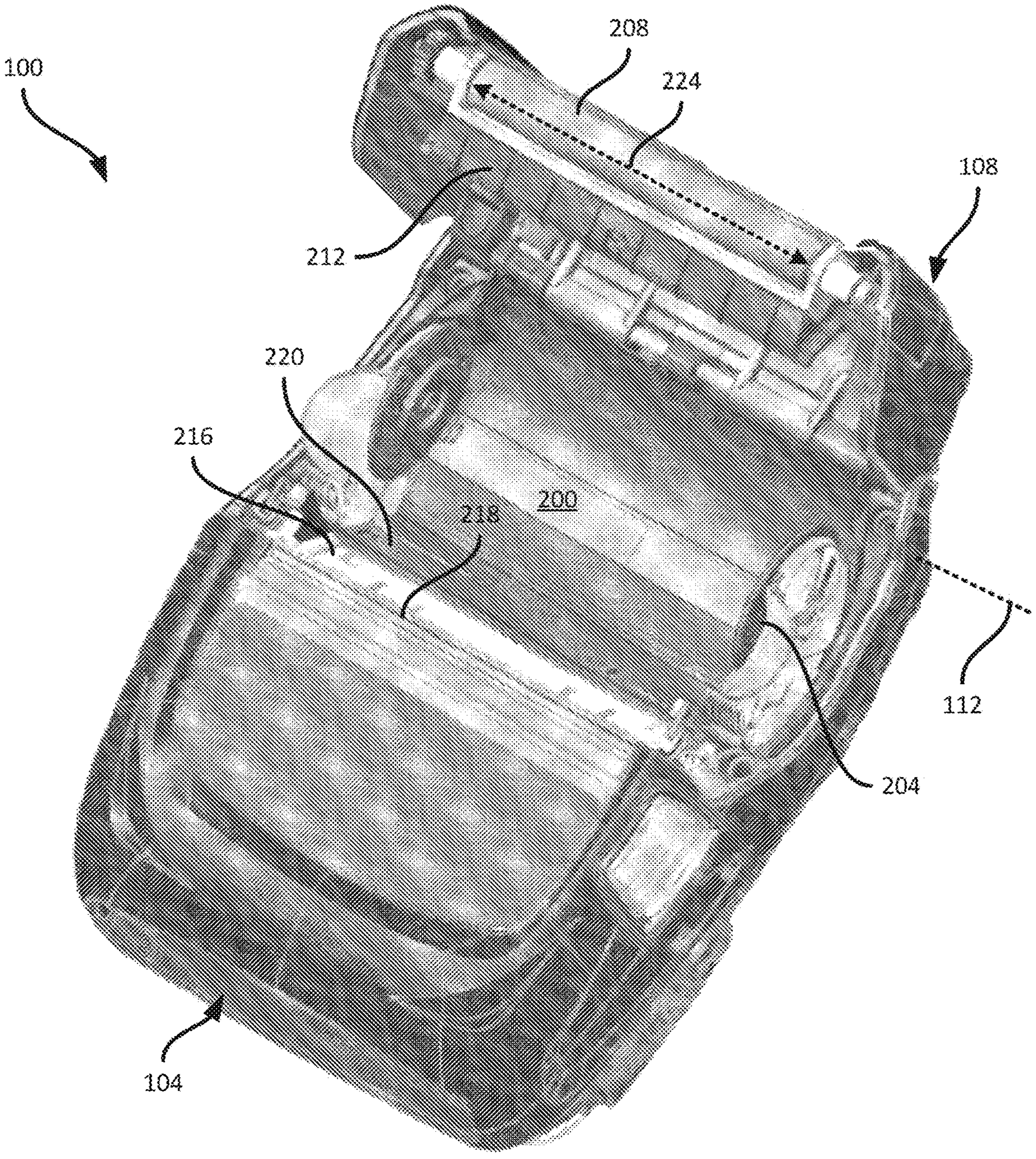
FIG. 2 is a diagram of the printer of FIG. 1, with the lid in an open position.

Turning to FIG. 2, the printer 100 is shown with the cover 108 in the open position, revealing the above mentioned media supply chamber 200. The chamber 200 can include supports 204 for a spool of media (not shown). As seen in FIG. 2, the cover 108 includes a platen roller 208 and at least one guide surface 212. The guide surface is upstream of the platen roller 208, in that media travelling from the chamber 200 to the platen roller 208 first traverses the guide surface 212. The guide surface 212, in other words, defines a portion of a media path travelled by the media.

The body 104 also includes guide surfaces defining portions of the media path. In particular, the body 104 includes a print head 216 which forms the above-mentioned nip 218 with the platen roller 208 when the cover 108 is closed. The print head 216 itself also defines a guide surface upstream of the nip 218. The body 104 may also include one or more additional guide surfaces, such as a guide surface 220, upstream of the print head 216. In general, when the cover 108 is closed, the guide surface 212 interacts with the guide surface of the print head 216 and the guide surface 220 to define a media path that guides the media toward the nip 218. The media path, in other words, is a volume of space between the guide surface 212 and the print head 216 and guide surface 220, e.g. with a thickness of about 2 mm, and a width that is substantially equal to a width 224 of the platen roller.

Figure 3:
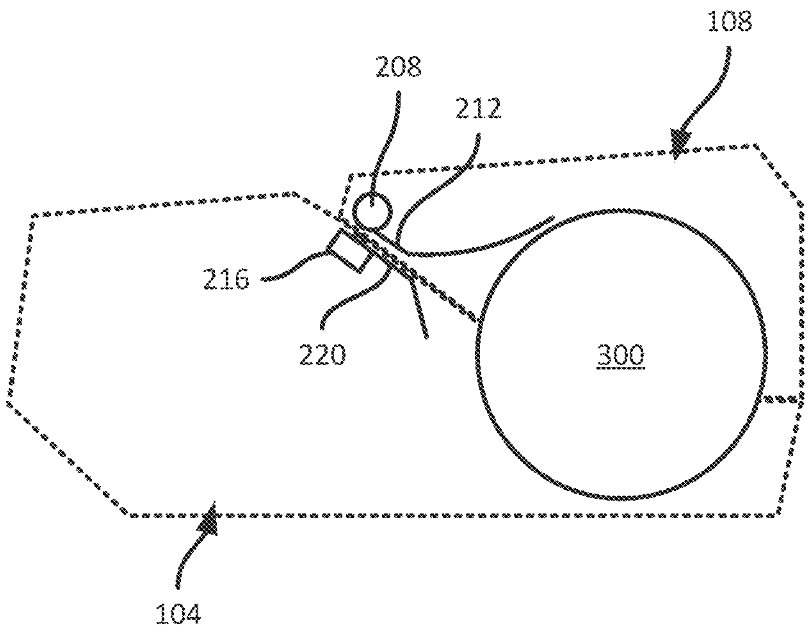
FIG. 3 is a side view of the printer of FIG. 1, illustrating certain internal components of the printer.
Figure 4:
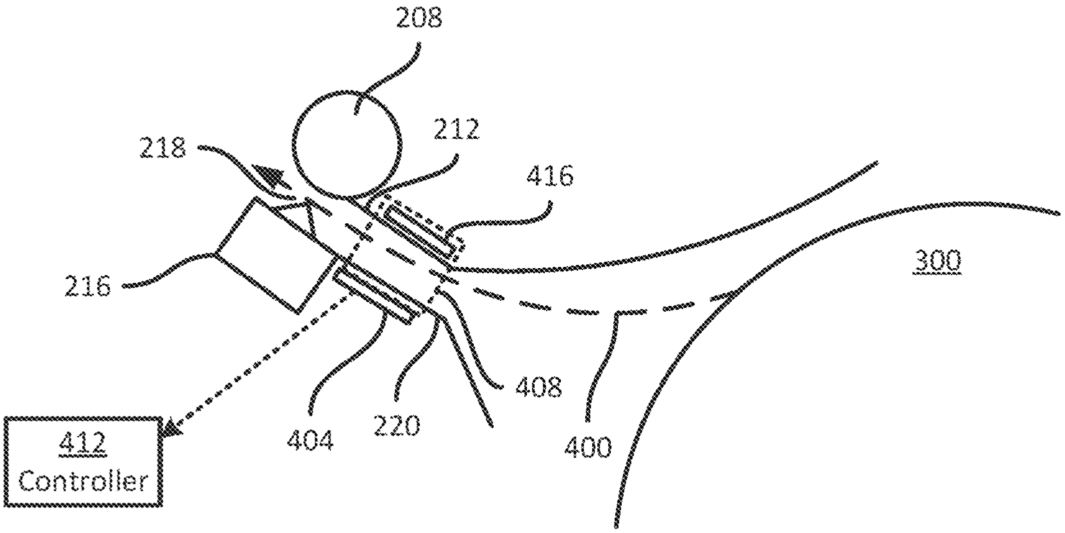
FIG. 4 is a detail view of a portion of the printer as shown in FIG. 3.

Turning to FIGS. 3 and 4, the arrangement of the inductive sensor will be described in further detail. FIG. 3 illustrates a simplified side view of the printer 100, with certain internal components highlighted. In particular, the platen roller 208, as well as the guide surface 212 of the cover 108, are shown. In addition, the print head 216 and the guide surface 220 of the body 104 are illustrated, along with a spool 300 of media, which is dispensed toward the nip formed by the print head 216 and the platen roller 208.

FIG. 4 illustrates a detailed view of a portion of the internal arrangement of components shown in FIG. 3. Specifically, FIG. 4 shows a media path 400 travelling from the spool 300, between the guide surfaces 212 and 220 and towards the nip 218 formed by the print head 216 and the platen roller 208. As will be apparent, after the media traverses the nip 218, the media is dispensed from the outlet 106.

Also shown in FIG. 4 is an inductive sensor 404, which is disposed at the guide surface 220. More generally, the inductive sensor is disposed at a guide surface of either the body 104 or the cover 108. Thus, in other examples, the sensor 404 may be integrated with the print head 216, which also includes a guide surface. In further examples, the sensor 404 may be integrated with a guide surface of the cover 108. The sensor 404 is shown as lying on or behind the guide surface 220. That is, the sensor 404 may be affixed to the guide surface 220 such that the sensor 404 is directly exposed to the media path 400, or the sensor 404 may be embedded in a portion of the body 104 that defines the guide surface 220.

The sensor 404 includes any suitable inductive sensor, an example of which includes the LDC0851 sensor manufactured by Texas Instruments™. The sensor 404 generates an oscillating magnetic field in a sense coil thereof, which is perturbed by the presence of a metallic object within a sensing volume 408. The sensor 404 detects such perturbation and generates a detection signal, e.g. for transmission to a controller 412 of the printer 100. As shown in FIG. 4, the sensing volume 408 extends across the media path 400 towards the guide surface 212 of the cover 108. The cover 108, in turn, includes a target conductor 416 that is detectable by the sensor 404 when the conductor 416 is within the sensing volume 408. The target conductor 416 is disposed at (i.e. directly on or just behind) the guide surface 212, and the sensor 404 is therefore configured such that the sensing volume 408 has a thickness that is substantially equal to the thickness of the media path 400. As a result, the conductor 416 falls within the sensing volume 408 only when the cover 108 is fully closed, with both sides of the cover 108 contacting the corresponding sides 124 of the body 104 (e.g. and latches at both sides of the cover 108 engaging with both sides 124 of the body 104).

The conductor 416 can be a strip of conductive material, such as copper tape or the like, applied to the outer surface of the cover 108, or embedded within a plastic or other frame portion of the cover 108 at the guide surface 212.

In some examples, rather than a binary signal indicating whether the conductor 416 is present or not present (corresponding to the cover 108 being closed or open, respectively) the sensor 404 can report a detected distance to the conductor, based on the degree of disturbance to the field mentioned above, which varies with the proximity of the conductor 416 to the sensor 404. In such examples, the controller 412 may be configured to interpret a distance below a predetermine threshold as indicating that the cover 108 is closed, and any distance above the threshold as indicating that the cover 108 is at least partially open. In further examples, the above threshold assessment may be performed at the sensor 404 itself, with the result detection signal transmitted to the controller 412 rather than a measured distance to the conductor 416.

As will now be apparent, the use of the inductive sensor 404 and conductor 416 rather than the flag and optical sensor or mechanical latching sensors mentioned above renders the cover state detection mechanism of the printer 100 less prone to obstruction by dust or other environmental factors (which have little or no effect on the sensor 404). The sensor 404 and conductor 416 are also less susceptible to damage as a result of drops or other impacts suffered by the printer 100, as a result of having no components protruding outwards from the guide surfaces 212 and 220 that could be knocked out of alignment, broken off or the like.

Figure 5:
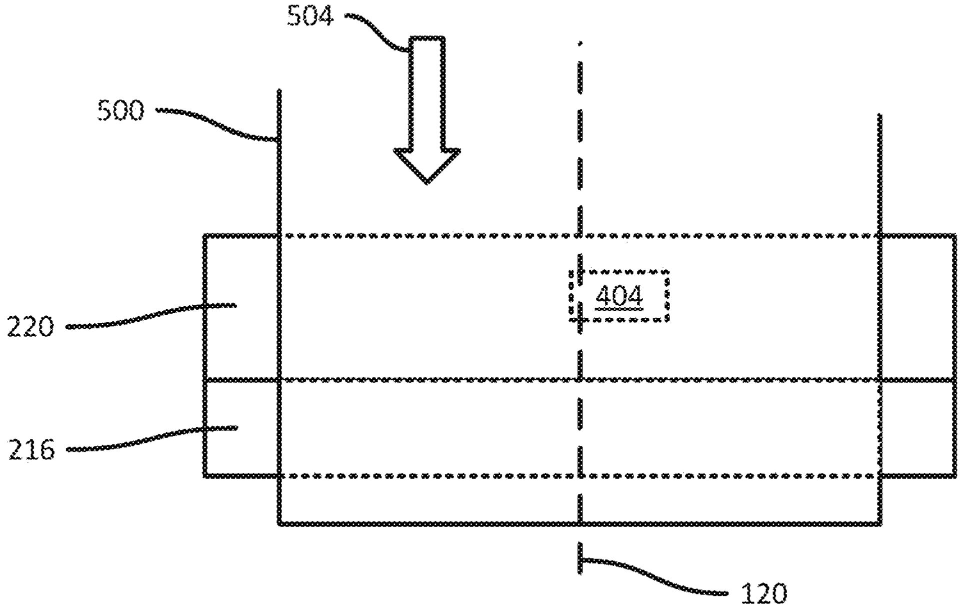
FIG. 5 is an overhead view of the base of the printer of FIG. 1.

Further, because the sensor 404 and conductor 416 do not require any direct physical engagement with one another to function, the sensor 404 and conductor 416 can be mounted such that the sensing volume 408 intersects the media path 400. Specifically, FIG. 5 illustrates a simplified overhead view of a portion of the body 104, including the print head 216, the guide surface 220 and a length of media 500 travelling in a direction 504 along the media path 400 shown in FIG. 4. The sensor 404 is also illustrated beneath the media 500, such that the sensing volume 408 extends through the media 500.

Figure 6:
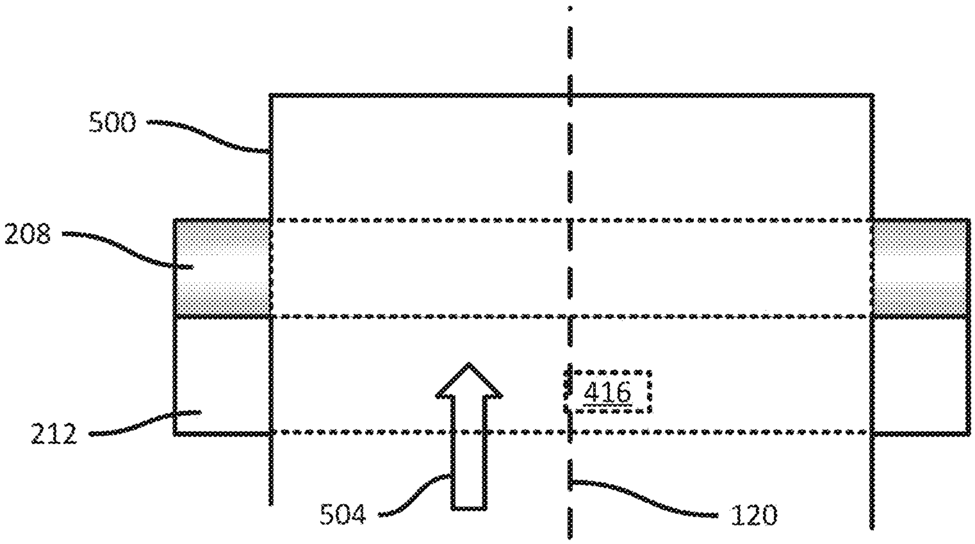
FIG. 6 is a diagram of an underside of the cover of the printer of FIG. 1.
Figure 7:
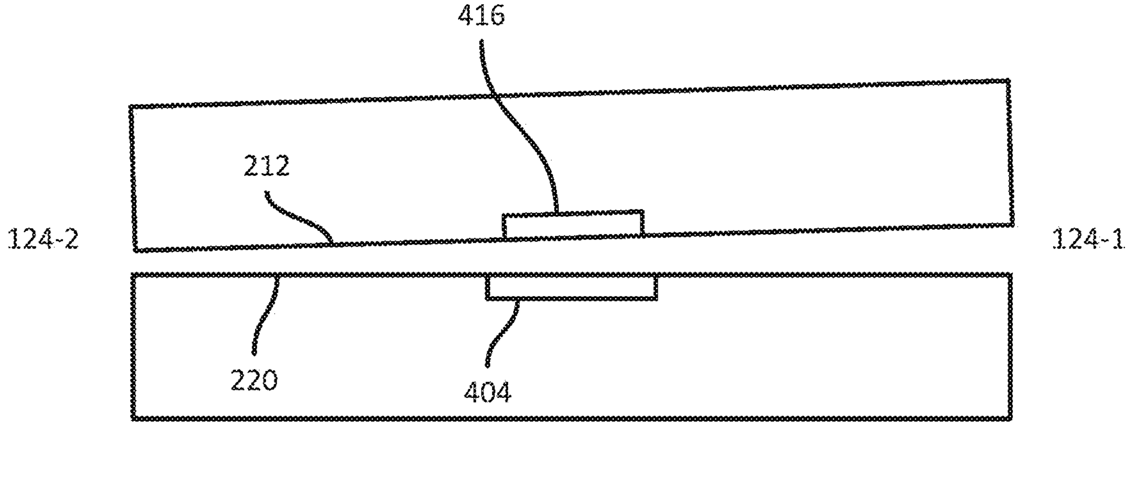
FIG. 7 is a diagram illustrating a partially closed cover of the printer of FIG. 1.
Figure 8:
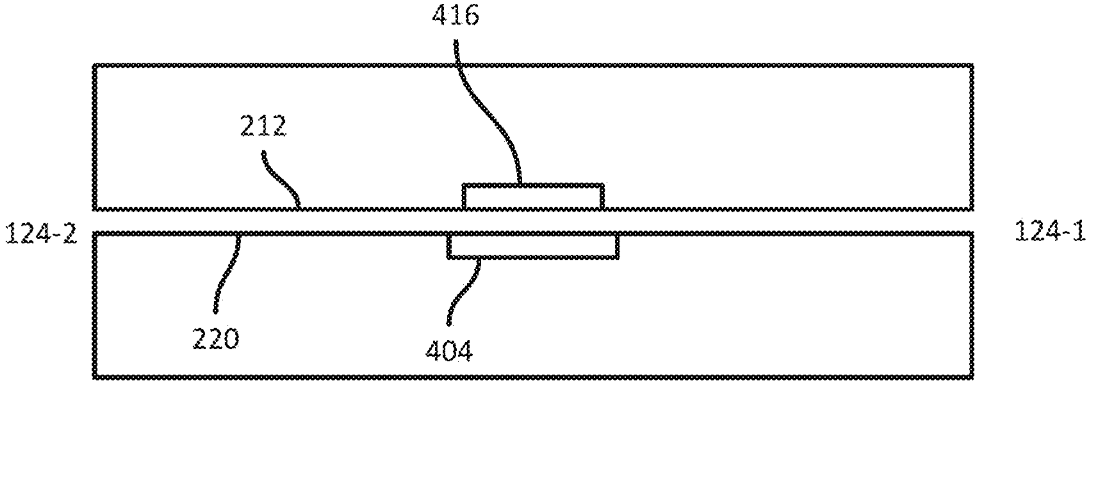
FIG. 8 is a diagram illustrating a fully closed cover of the printer of FIG. 1.

FIG. 6 illustrates an underside of the cover 108, in which the conductor 416 is disposed near the midline 120 in a position complementary with the position of the sensor 404 shown in FIG. 5. As will be apparent, latching or optical mechanisms used in other printers must be placed outside the media path 400 to avoid interfering with travel of the media 500. Turning to FIGS. 7 and 8, placement of the sensor 404 and target conductor 416 such that the sensing volume 408 intersects with the media path 400 may enable the sensor 404 to more accurately report the state of the cover 108 by reducing the incidence of false closed-state detections.

As shown in FIG. 7, when the cover 108 is partially closed (e.g. latched on the side 124-2, but not yet latched on the side 124-1) the distance between the sensor 404 and the conductor 416 may remain large enough that a closed state is not reported by the sensor 404. A latching or optical sensor implemented close to the side 124-2, however, is more likely to incorrectly report that the cover 108 is closed. The sensor 404, at least partly by virtue of being deployable within the media path 400 rather than at one of the sides 124, is less likely to report that the cover 108 is closed until the cover 108 is closed at both sides 124, as shown in FIG. 8, reducing the distance between the conductor 416 and the sensor 404.

Variations to the above are contemplated. For example, the sensor 404 can be configured to detect two states. The first state, as discussed above, can be a cover state, indicating whether the cover 108 is closed or open. The second state, when the cover 108 is closed, can indicate the presence of a further conductor, in addition to the conductor 416. Specifically the media 500 can include conductive elements, such as radio frequency identification (RFID) tags embedded in labels. Placing the sensor 404 such that the sensing volume 408 traverses the media path 400 enables the sensor 404 enables the sensor 404 to detect such tags as the media 500 travels past the sensor 404. The presence of both the conductor 416 and a tag within the sensing volume 408 may be distinguishable by the sensor 404 from the presence of the conductor 416 alone within the sensing volume 408. The sensor 404, in such examples, may therefore report two distinct signals to the controller 412. A first signal can report changes in the presence of the conductor 416 (i.e. indicating whether the cover 108 is closed or open), and a second signal can report movement of the media 500. The second signal may indicate, for example, that the media 500 has been prepared for printing following closure of the cover 108, and that operation of the printer 100 may begin.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media processing device, comprising:

a printhead;

a platen roller;

a body defining a media supply chamber;

a cover having an open position enabling access to the media supply chamber, and a closed position enclosing the media supply chamber, and cooperating with the body to define a media path extending from the media supply chamber, between the print head and the platen roller, to a media outlet;

a target conductor disposed on one of the body and the cover;

an inductive proximity sensor affixed to the other of the body and the cover and configured to sense the target conductor when the cover is closed, the inductive proximity sensor outputs a first detection signal in response to detecting the target conductor and a second detection signal in response to detecting a further conductor traveling on the media path, the further conductor is a wireless tag affixed to media traveling on the media path.

2. The media processing device of claim 1, wherein the target conductor is a strip of conductive material.

3. The media processing device of claim 1, wherein the inductive proximity sensor is affixed to the body, and wherein the target conductor is affixed to the cover.

4. The media processing device of claim 3, wherein the inductive proximity sensor is disposed at a first media path guide surface of the body, the target conductor is disposed at a second media path guide surface of the cover, and the inductive proximity sensor defines a sensing region that intersects the media path.

5. The media processing device of claim 4, wherein the inductive proximity sensor has a range substantially equal to a distance between the first and second guide surfaces when the cover is closed.

6. The media processing device of claim 1, further comprising:

a controller, wherein the inductive proximity sensor is configured to send a signal to the controller.

7. The media processing device of claim 6, wherein the signal includes at least one of a cover state or a distance between the sensor and the target conductor.

8. The media processing device of claim 1, wherein the cover includes a rear portion rotatably coupled to the body at a hinge, and a forward portion carrying at least one of the inductive proximity sensor or the target conductor and carrying the platen roller.

9. The media processing device of claim 1, further comprising: a controller in communication with the inductive proximity sensor, wherein the controller determines the cover is closed in response to the first detection signal and determines that the media is prepared for printing in response to the second detection signal.

10. A method, comprising:

disposing a target conductor on one of the body and the cover of a media processing device, the body defining a media supply chamber and cover being moveable between an open position enabling access to the media supply chamber and a closed position enclosing the media supply chamber, the body and cover defining a media path extending from the media supply chamber, between a print head and a platen roller of the media processing device and to a media outlet of the media processing device when the cover is in the closed position, a target conductor disposed on one of the body and the cover and an inductive proximity sensor affixed to the other of the body and the cover;

sensing, via the inductive proximity sensor, the target conductor when the cover is closed, the inductive proximity sensor outputting a first detection signal in response to detecting the target conductor and outputting a second detection signal in response to detecting a further conductor traveling on the media path.

11. The method of claim 10, wherein the further conductor is a wireless tag affixed to media traveling on the media path.

12. The method 11, further comprising:

determining, via a controller of the media processing device, that the cover is closed in response to the first detection signal; and determining that the media is prepared for printing in response to the second detection signal.

13. A method, comprising:

obtaining a body of a media processing device having a first guide surface that includes one of an inductive proximity sensor or a target conductor;

attaching a cover to the body via joint, the cover having an open position and a closed position, the cover defining a second guide surface that includes the other the inductive proximity sensor or the target conductor, the second guide surface configured to cooperate with the first guide surface when the cover is in the closed position to align the inductive proximity sensor and the target conductor and define a media path between the inductive proximity sensor and the target conductor such that media travelling from a media supply to a media outlet passes between the inductive proximity sensor and the target conductor; and configuring the inductive proximity sensor to detect the target conductor through the media when the cover is in the closed position and to output a signal representative of the cover being in closed position in response to detecting the target conductor.

14. The method of claim 13, further comprising:

programming a controller of the media processing device to receive the signal and determine that the cover is in the closed position.

15. The method of claim 14, wherein the inductive proximity sensor is configured to sense further conductor in the form of a wireless tag affixed to media traveling on the media path and output a further signal representative of sensing the further conductor.

16. The method 15, further comprising:

programming the controller to determine that the media is prepared for printing in response to the further signal.

* * * * *